(12) United States Patent
Cousy et al.

(10) Patent No.: US 6,936,953 B2
(45) Date of Patent: Aug. 30, 2005

(54) USE OF A PIEZO-ACTIVE DEVICE AND AN APPLIANCE AND A SYSTEM INCLUDING IT

(75) Inventors: Jean-Pierre Cousy, Verneuil sur Vienne (FR); François Barillot, Grenoble (FR); Franck Claeyssen, Meylan (FR); Miguel Debarnot, Brignoud (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 228 days.

(21) Appl. No.: 10/170,548

(22) Filed: Jun. 14, 2002

(65) Prior Publication Data

US 2003/0016089 A1 Jan. 23, 2003

(30) Foreign Application Priority Data

Jun. 15, 2001 (FR) .............................................. 01 07885

(51) Int. Cl.[7] .............................................. H01L 41/08
(52) U.S. Cl. ...................................................... 310/317
(58) Field of Search ................................ 310/317, 318, 310/329, 337, 328; 340/191, 189; 367/163; H01L 41/08

(56) References Cited

U.S. PATENT DOCUMENTS

| | | | |
|---|---|---|---|
| 2,928,052 A | | 3/1960 | Wood |
| 3,274,537 A | | 9/1966 | Toulis |
| 3,541,360 A | | 11/1970 | Tonari |
| 4,001,798 A | * | 1/1977 | Robinson ................ 340/870.18 |
| 4,595,864 A | | 6/1986 | Stiefelmeyer et al. |
| 4,612,472 A | | 9/1986 | Kakizaki et al. |
| 4,808,874 A | * | 2/1989 | Stahlhuth ..................... 310/328 |
| 4,845,688 A | * | 7/1989 | Butler .......................... 367/174 |
| 5,065,067 A | | 11/1991 | Todd et al. |
| 5,191,252 A | | 3/1993 | Sano |
| 5,239,904 A | | 8/1993 | Yamaguchi et al. |
| 5,801,475 A | | 9/1998 | Kimura |
| 5,934,882 A | | 8/1999 | Olney et al. |
| 5,941,692 A | | 8/1999 | Olney et al. |

FOREIGN PATENT DOCUMENTS

| | | | | |
|---|---|---|---|---|
| FR | 2745476 | * | 3/1996 | ............ H02N/2/18 |
| FR | 2 740 276 | | 4/1997 | |
| FR | 2 745 476 | | 9/1997 | |
| GB | 2 095 053 A | | 9/1982 | |
| JP | A 58-103015 | | 6/1983 | |
| JP | 61-42284 | | 2/1986 | |
| JP | A 61-42284 | | 2/1986 | |
| WO | WO 97/44883 | | 11/1997 | |
| WO | 98/11575 | | 3/1998 | |
| WO | 01/45139 | | 6/2001 | |

* cited by examiner

*Primary Examiner*—Darren Schuberg
*Assistant Examiner*—Karen Addison
(74) *Attorney, Agent, or Firm*—Young & Thompson

(57) ABSTRACT

A piezo-active device includes a piezo-electric element and an elastically deformable shell in which the piezo-electric element is disposed. The use of this piezo-active device includes, for supplying power to an electrical circuit connected to the piezo-electric element, the step of exerting on the piezo-active device a punctual mechanical action and then allowing the piezo-active device to resonate freely. An appliance includes this kind of piezo-active device, en electrical circuit connected to the piezo-electric element, and means for exerting the punctual mechanical action. A system includes this kind of appliance whose electrical circuit can emit electromagnetic waves and a second appliance adapted to receive waves emitted by the first appliance. Applications include controlling a spotlight.

29 Claims, 9 Drawing Sheets

USE OF A PIEZO-ACTIVE DEVICE AND AN APPLIANCE AND A SYSTEM INCLUDING IT

BACKGROUND OF THE INVENTION

1. Field of the Invention

The invention relates to piezo-active devices.

2. Description of the Prior Art

There is already known, in particular from French patent application 2 740 276, a device of this kind designed to serve as a high stiffness amplified actuator, which device is adapted to be integrated into devices for micropositioning diverse objects or control mechanisms, the device including a piezo-electric element and an elastically deformable metal shell with a substantially elliptical profile extending along a minor axis and along a major axis disposed transversely relative to each other, the shell having four vertices opposed in pairs, respectively two minor axis vertices (the more closely spaced pair of opposite vertices) and two major axis vertices (the less closely spaced pair of vertices), the piezo-electric element being disposed in the shell between the major axis vertices.

The invention aims to increase the possibility of using this kind of piezo-active device.

SUMMARY OF THE INVENTION

To this end it proposes the use of a piezo-active device including a piezo-electric element and an elastically deformable shell with a substantially closed profile, the piezo-electric element being disposed it the shell, which use includes:

the step of connecting the terminals of the piezo-electric element to the input terminals of an electrical circuit adapted to receive an alternating current power supply; and for supplying power to the electrical circuit, the step of exerting a punctual mechanical action on the device and then allowing it to resonate freely so that, subsequently to the punctual mechanical action, the piezo-electric element produces an alternating current voltage between its terminals and therefore between the input terminals of the circuit.

In the use in accordance with the invention, the piezo-active device serves as a mechanical oscillator capable of resonating over a relatively long time period following exercise of the punctual mechanical action, which enables a certain form of storage of the energy contributed by that action, and therefore enables the piezo-electric element to produce the alternating current electrical voltage during a certain time period following the punctual mechanical action.

This possibility of long-term production of the alternating current voltage is particularly interesting if the electrical circuit needs to be supplied with power under certain conditions in order for it to operate, and in particular with a power supply voltage that remains above a given threshold for a relatively long time period, for example several milliseconds.

In accordance with preferred features, the elastically deformable shell has an elliptical profile with four vertices opposed in pairs, namely two minor axis vertices and two major axis vertices, with the distance between the two major axis vertices greater than the distance between the two minor axis vertices, the piezo-electric element is disposed in the shell between the two major axis vertices, and the piezo-active device further includes a localized weight fastened to the shell at a minor axis vertex and whose mass is greater than that of the shell.

The presence of the localized weight offers the advantage of minimizing the phenomenon of complex behavior, i.e. the phenomenon of having a plurality of resonant frequencies, and more generally of good control of the operation of the oscillator that the piezo-active device constitutes, which, thanks to the localized weight, approximates the classical model of the elastic pendulum consisting of a weight at the end of a spring of zero mass.

The weight preferably has a mass more than four times that of the shell.

The device preferably includes a weight fastened to the shell at each of the minor axis vertices.

Accordingly, when the oscillator that the device forms resonates, the displacement of the minor axis vertices is in phase opposition and the maximum deformation of the piezo-electric element is therefore is obtained, and consequently the best characteristics of electro-mechanical coupling, optimizing the transformation between mechanical energy and electrical energy effected by the piezo-electric element, especially if all said weights have substantially the same mass.

According to other preferred features, the punctual mechanical action is exerted on the device at a location other than on the piezo-electric element.

This avoids the risk of damaging the element, and in particular of breaking it if it is made of high stiffness ceramic whose impact resistance is low.

In particular, if the piezo-electric device includes a localized weight, as described above; said punctual mechanical action is exerted on said device at the level of one of said weights.

The transfer of energy between the punctual mechanical action and the piezo-active device is then particularly efficient.

A second aspect of the invention provides an electrical appliance including a device used as previously explained.

It is aimed more precisely at an electrical appliance which includes:

a piezo-active device including a piezo-electric element and an elastically deformable shell with a closed profile, the piezo-electric element being disposed in the shell;

an electrical circuit adapted to be supplied with power by an alternating current and having input terminals connected to the terminals of the piezo-electric element; and for supplying power to the electrical circuit, means for applying a punctual mechanical action to the appliance.

In a first embodiment of the appliance according to the invention, when the piezo-active device includes at least one localized weight, the appliance includes a frame to which is attached one of the minor axis vertices of the shell, the other minor axis vertex, at which the shell is fastened to a weight, being mobile relative to the frame.

In an alternate embodiment the appliance includes a frame, on which the appliance is mounted so that each minor axis vertex of the shell is mobile relative to the frame.

According to preferred features of the latter embodiment, for mounting the appliance an the frame, at least one weight is connected to the frame by spring means.

This is advantageous where certain resonance characteristics are required and also has the advantage of avoiding or at least limiting the transmission of vibrations to the frame.

For the same reasons, each weight is preferably connected to the frame by an identical leaf spring disposed parallel to the leaf spring of the other weight.

According to preferred features of both embodiments of the appliance, the appliance includes a percussion weight guided relative to the frame to strike the weight or one of the weights fastened to the shell.

This kind of percussion weight provides a particularly simple, convenient and economical way of causing the oscillator that the piezo-active device forms to resonate.

Preferably, for practical reasons of implementation, the percussion weight is part of activation means further including, for launching the weight:

spring means for spring-loading the percussion weight toward a position or impact on the shell weight that it must strike;

drive means, acting against the spring means of the percussion weight, for moving it from a rest position to an armed position; and releasable connecting means between the drive means and the percussion weight adapted, when said armed position is reached, to release the percussion weight, which is then accelerated by the spring means which drive it to the impact position.

Preferably, for the same reasons:

the rest position and the impact position are coincident; and/or the percussion weight is of substantially the same mass as the shell that it must strike.

According to preferred features of the appliance according to the invention, the electrical circuit includes:

a rectifier system formed by four diodes in a Grätz bridge to perform full-wave rectification, the input terminals of the rectifier system forming the input terminals of the electrical circuit and therefore being connected to the terminals of the piezo-electric element;

a capacitor connected to the output terminals of the rectifier system; and a circuit adapted to be supplied with power by an alternating current whose power supply terminals are connected to the output terminals of the rectifier system so that the circuit is in parallel with said capacitor.

The rectifier-shaper circuit formed by the rectifier system and by the capacitor offers not only the advantage of allowing the use of a circuit to be powered by a direct current but also, thanks to the capacitor, that of allowing a certain form of storage and then restoration of electrical energy, achieving a particularly long time period, for example several tens of milliseconds, of effective supply of power to the circuit to be supplied with power by a direct current.

Preferably, to optimize the storage and then the restoration of electrical energy by the capacitor, the circuit adapted to be supplied with power by a direct current having a substantially constant input resistance R, the capacitor having a capacitance C, the term RC, R being expressed in $\Omega$ and C in F, is substantially equal to a predetermined duration allowing operation of the circuit adapted to be supplied with power by a direct current.

According to other preferred features of the appliance according to the invention, the electrical circuit includes a circuit adapted to emit electromagnetic waves supplied with electrical power by the piezo-electric element.

A third aspect of the invention provides a system including a first appliance as described above and a second appliance including a receiver circuit adapted to receive the waves emitted by the sender circuit that the first appliance includes.

In a preferred embodiment, the second appliance also includes electrical control means including a receiver circuit adapted to receive waves emitted by the emitter circuit that the first appliance includes and switching means used to control a spotlight, for example.

The description of the invention will now continue with the following description of embodiments of the invention, which is given by way of illustrative and nor limiting example and with reference to the accompanying drawings.

DETAILED DESCRIPTION OF THE PREFERRED EMBODIMENTS

Figure 1:
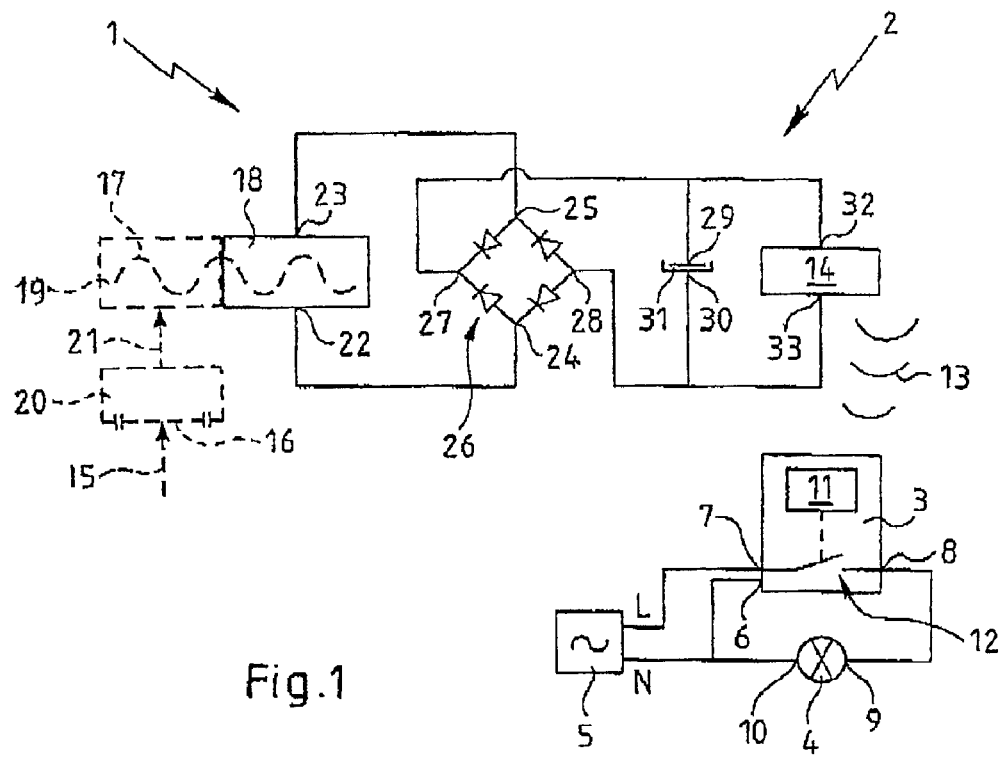
FIG. 1 is a diagrammatic representation of a system according to the invention including, on the one hand, a wireless electrical appliance provided with an emitter circuit and, on the other hand, an electrical appliance connected to the mains and to a spotlight and provided with a receiver circuit in order to control the spotlight as a function of the signals emitted by the wireless appliance.

The system 1 represented in FIG. 1 includes a wireless electrical remote control appliance 2 and a switch-receiver electrical appliance 3 connected to a spotlight 4 and to the electrical mains supply 5 of the premises in which the spotlight 4 is installed, the system that the appliances 2 and 3 form being adapted to control the spotlight 4.

In FIG. 1, the mechanical appearance of the appliance 2 is shown in dashed line while the electrical aspect is shown in full line, although, for convenience, the piezo-electric element that the appliance includes is shown in full line although it also has a mechanical role, because of its elasticity.

The appliance 3 has three terminals 6, 7 and 8 respectively connected to the neutral pole N of the mains 5, to the live pole L and to the terminal 9 of the spotlight 4, the other terminal 10 of the latter being connected to the neutral pole N.

The appliance 3 includes a receiver circuit 11 connected to switching means 12 disposed between the terminals 7 and 8. The receiver circuit 11 is responsive to and receives a signal 13 emitted by the emitter circuit 14 of the appliance 2 in response to an action 15 exerted by a user on the rocker 16 of that appliance, the switching means 12 making or breaking the connection between the terminals 7 and 8 alternately on each reception of a signal 13.

Accordingly, each time that an action 15 is exerted on the rocker 16, the spotlight 4 is alternately turned on and off.

In the appliance 2, the action 15 is converted into an oscillatory mechanical excitation 17 exerted on a piezo-electric element 18 by movement transformation means that include a mechanical interface 19 and activation means 20 to which the rocker 16 belongs, the action 15 exerted by the user on the rocker 16 being transformed by the activation means 20 into a punctual mechanical action 21 exerted on the interface 19, which causes the mechanical oscillator formed by the interface 19 and by the element IS mechanically connected to that interface to resonate, the oscillator then resonating freely and being the site of the oscillatory mechanical excitation 17, the effect of which is that the element 18 produces an alternating current voltage.

The two terminals 22 and 23 of the piezo-electric element 18 are respectively connected to the input terminal 24 and to the input terminal 25 of a rectifier system 26 formed by four diodes disposed in a Grätz bridge to provide full-wave rectification, the output terminals 27 and 28 of the system 26 being respectively connected to the terminal 29 and to the terminal 30 of a capacitor 31, the terminals 29 and 30 being also respectively connected to the terminal 32 and to the terminal 33 which are the power supply terminals of the emitter circuit 14, the rectifier system 26 and the capacitor 31 disposed in parallel at its output terminals 27 and 28 forming a rectifier-shaper circuit disposed between the terminals 22 and 23 of the piezo-electric element 18 and the power supply terminals 32 and 33 of the emitter circuit 14.

As indicated above, the oscillatory mechanical excitation 17 exerted on the piezo-electric element 16 causes an alternating current voltage to appear between the terminals 22 and 23. This voltage is rectified by the system 26 and smoothed by the capacitor 31 so that there appears between the terminals 32 and 33 of the emitter circuit 14 a rectified and smoothed voltage that enables it to emit the signal 13, the latter being emitted complete provided that the voltage between the terminals 32 and 33 remains greater than 1 volt (V) for a time period greater than 20 milliseconds (ms).

Figure 2:
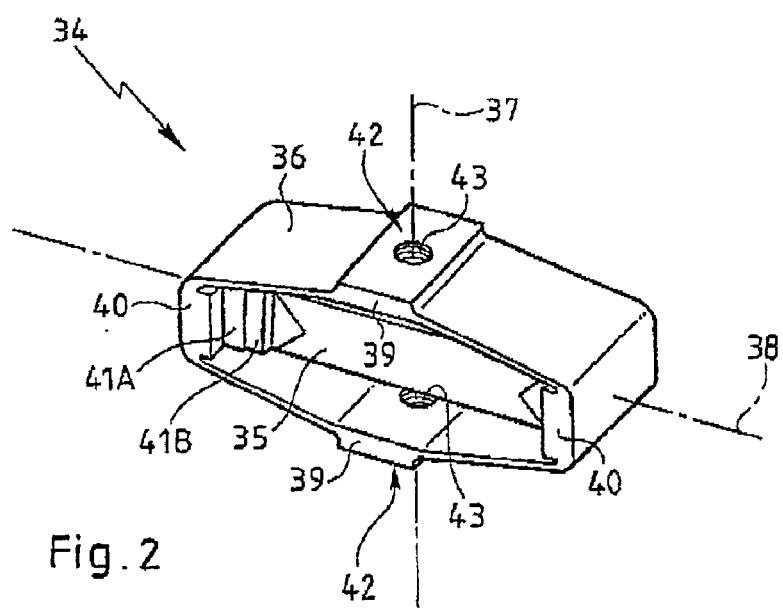
FIG. 2 is a perspective view of a prior art piezo-active device including a piezo-electric element and a shell with a substantially elliptical profile in which the piezo-electrical element is disposed.

The piezo-electric device 34 shown in FIG. 2 is known in the art, in particular from French patent application 2 740 276, as a high stiffness amplified piezo-active actuator adapted to be integrated into devices for micropositioning various objects or control mechanisms.

The device 34 includes a piezo-electric element 35 and an elastically deformable metal shell 36 with a substantially elliptical profile extending along a minor axis 37 and along a major axis 38 disposed transversely to each other, the shell 36 having four vertices opposed in pairs, respectively two minor axis vertices 39 (the pair of opposed vertices the closest together) and two major axis vertices 40 (the pair of vertices the farthest away from each other), the piezo-electric element 35 being disposed in the shell 36 between the vertices 40.

In the rest state shown in FIG. 2, the shell 36 is deformed relative to the equilibrium state that it would assume if it were on its own, in order to exert on the element 35 a compression force oriented along the axis 38, the vertices 40 being held further apart from each other than in the equilibrium state thanks to the element 35 and to spacers 41A and 41B disposed between one vertex 40 and one end of the element 35.

Here, the distance between the vertices 39 is about equal to half the distance between the vertices 40 so that, if the element 35 expands, because of an electrical voltage applied between its terminals, the vertices 40 move apart by a distance equal to the amplitude of the expansion of the element 35, whereas the vertices 39 move toward each other by a distance that is substantially twice the expansion of the bar 35. The movements of the vertices 39 are therefore amplified relative to expansion and contraction movements of the element 35.

Of course, the service conditions for the device 34 are such that, when it is contracted to the maximum, the element 35 remains compressed by the shell 36, a compression force being necessary for the coupling between the element 35 and the shell 36.

Furthermore, the compression force existing in the rest state is such that the element 35 has the same propensity to expand as to contract, in order for the response of the device 34 to be symmetrical.

For fixing the device 34 to the elements with which it must cooperate, the shell 36 has at each vertex 39, on the outside, a flat face 42 at the center of which is a threaded hole 43.

Although the shell 36 is designed, as indicated above, to amplify the expansion and compression movement of the element 35 in response to variations of the voltage at the terminals of the latter, because of the elasticity of the shell 36 and of the piezo-electric element 35, the device 34 can resonate when it is subjected to a punctual mechanical action consisting of an impact or of a rapid relaxation from a deformed state, or a succession of such actions.

If one of the vertices 39 is immobilized, for example fixed rigidly to a frame, whereas the other vertex 39 is free, given the high rigidity conferred on it conjointly by the element 35 and by the shell 36, the device 34 has a resonant frequency that is of the order of 2.9 kilohertz (kHz).

The oscillatory mechanical excitation of which the device 34 is then the site causes an alternating current voltage to appear at the terminals of the element 35 whose characteristics, in particular frequency and amplitude characteristics, reflect those of the mechanical excitation.

Given the choice, as explained above, of the compression force in the rest state, this alternating current voltage is centered on an average value which is considered hereinafter to be equal to 0.

Figure 3:
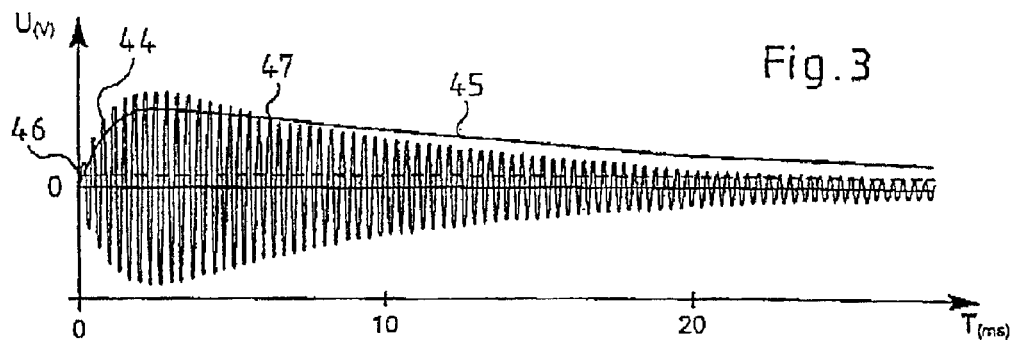
FIG. 3 is a graph, obtained from a mathematical model based on various hypotheses, of the electrical circuit of the wireless appliance shown in FIG. 1, showing how, as a function of time, plotted on the abscissa axis, the respective voltage, plotted on the ordinate axis, at the terminals of the piezo-electric element and at the power supply terminals of the emitter circuit varies when the piezo-electric element is subjected to oscillatory mechanical excitation of the type to which the piezo-electric element of the piezo-active device shown in FIG. 2 is subjected from the time at which that device is caused to resonate by punctual mechanical action.

To explain properly the operation of the appliance 2, more specifically its elliptical aspect, FIG. 3 shows two voltage timing diagrams obtained by modeling the electrical circuit of the appliance 2, the model used assuming that:

the piezo-electric element 18 is subject to the same oscillatory mechanical excitation as that which is exerted on the element 35 from the time at which the member 34 begins to resonate under the conditions indicated above;

the piezo-electric element 18 includes, in addition to the electrical power supply due to the mechanical excitation exerted on it, a resistance of 10 kilohms (kΩ) and a capacitance of 0.64 microfarad ($\mu$F), each disposed in parallel with the terminals of the power supply;

the rectifier system 26 is formed by perfect diodes;

the smoothing capacitor 31 has a capacitance of 20 $\mu$F; and the emitter circuit 14 has a constant input resistance of 1 kΩ, regardless of the voltage between the terminals 32 and 33.

On the basis of the above model, and assuming that the device 34 begins to resonate at time T=0, the timing diagram of the voltage between the terminals 22 and 23 is as shown by the curve 44 in FIG. 3.

It is an alternating current voltage at approximately 2.9 kHz (29 periods in 10 ms) with an amplitude that increases rapidly and exponentially to a peak at about time T=2.4 ms, and then with an amplitude that decreases slowly and exponentially, with a time constant substantially equal to 10 ms (the time period over which the amplitude of the voltage changes from its maximum value $U_{max}$ to the value $U_{max}/e$, where e is Neper's number, which is equal to 2.718), which reflects, as indicated above, the characteristics of the oscillatory mechanical excitation.

The curve 45, representing the voltage obtained between the terminals 32 and 33 on the basis of the model referred to above, grows from time T=0 in about the same way as the amplitude of the curve 44, remaining slightly below the peaks of that curve, to reach a maximum, like the curve 44, at about the time T=2.4 ms, the curve 45 when decreasing more slowly than the amplitude of the curve 44.

The curve 45 reaches the value of 1 V substantially at time T=0.15 ms (point 46). The peak of the curve 45, reached substantially at T=2.4 ms, as previously indicated, is at a voltage value of the order of 7.5 V. Substantially at time T=6 ms, the curve 45 moves from an area in which it is below the amplitude of the curve 44 to an area in which it is above it, the voltage at this time being approximately 6.5 V (point 47).

Between time T=0 and point 47, the electrical energy supplied by the element 18 both charges the capacitor 31 and supplies power to the emitter circuit 14.

The simultaneous production of electrical energy by the piezo-electric element 18 and consumption of electrical energy by the emitter circuit 14 during this time period offers the advantage of improved transfer of energy than if there were, first of all, exclusively storage of electrical energy in the capacitor 31 and then exclusively consumption of the stored energy, for example because of switching means connecting the terminal 29 of the capacitor 31 either to the terminal 27 of the system 26 or to the terminal 32 of the emitter circuit 14, according to whether the voltage between the terminals 29 and 30 is respectively less than or greater than the amplitude of the voltage between the terminals 24 and 25.

After point 47, the voltage between the terminals 27 and 28 of the rectifier system 26 always remains greater than the voltage between the terminals 24 and 25 of, that system, in which no current can therefore flow. The electrical energy consumed by the resistance that models the emitter circuit 14 is therefore supplied exclusively by the capacitor 31 at this time.

Beyond point 47, the curve 45 therefore follows the well known curve for the discharge of a capacitor into a resistor, the time constant of which is RC, where R is the resistance of the resistor and C is the capacitance of the capacitor, respectively 1 kΩ and 20 $\mu$F in this example, so that the time constant is 20 ms.

Given the coordinates of point 47 (6 ms and 6.5 V), the voltage between the terminals 32 and 33 returns to the value of 1 V again at time T such that:

$$1 = 6.5 \cdot e^{\frac{T-6}{20}}$$

i,e. at time T=43.4 ms.

According to the model referred to above, a voltage at the terminals of the emitter circuit 14 above the threshold of 1 V is therefore obtained for approximately 43.2 ms, which is much more than the time period of 20 ms referred to above that is necessary for the circuit 14 to emit the complete signal 13.

Note that the capacitance of 20 $\mu$F of the capacitor 31 optimizes the time period for which the voltage between the terminals 32 and 33 remained above 1 V.

This is because, if the capacitor had been of higher value, for example 100 $\mu$F, all the other conditions remaining unchanged, in particular the voltage variations represented by the curve 44, then the increase in the voltage at the terminals of the capacitor would have been slower, and consequently the maximum value of the voltage reached at time T=2.4 ms at which the amplitude of the curve 44 is a maximum would also have been smaller, with the result that the 1 V threshold would not have been reached.

If, on the other hand, the capacitor 31 were replaced with a capacitor having a smaller capacitance, for example 10 $\mu$F, the maximum voltage reached at its terminals would be higher but the voltage reduction would then be faster, with the result that the total duration for which the voltage would remain above the threshold would be shorter.

What has just been said with regard to the capacitance of the capacitor 31 is valid more generally for the time constant RC.

Figure 4:
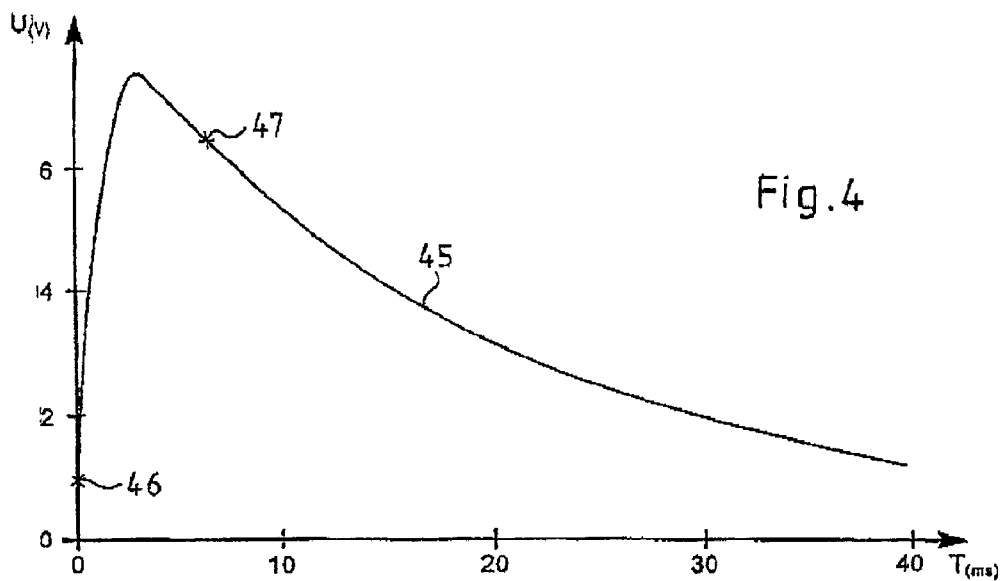
FIG. 4 shows, with the ordinate axis to a larger scale, how the voltage at the terminals of the emitter circuit varies.

In FIG. 4, the curve 45 is perfectly smooth, but in practice it features oscillations because the capacitor 31, prior to point 47, is subjected to a succession of periods in which its voltage increases and decreases in time with the half-waves of the curve 44.

It is known in the art that, for a full-wave rectified voltage, the smoothing effected by a capacitor in parallel with the terminals of the rectifier bridge and with the terminals of a resistive load depends on the term RCf, where f is the frequency of the alternating current voltage. Here, where the term RC has a value of 20 ms and the frequency f is 2.9 kHz, the term RCf is equal to 58, which corresponds to good smoothing.

Figure 5:
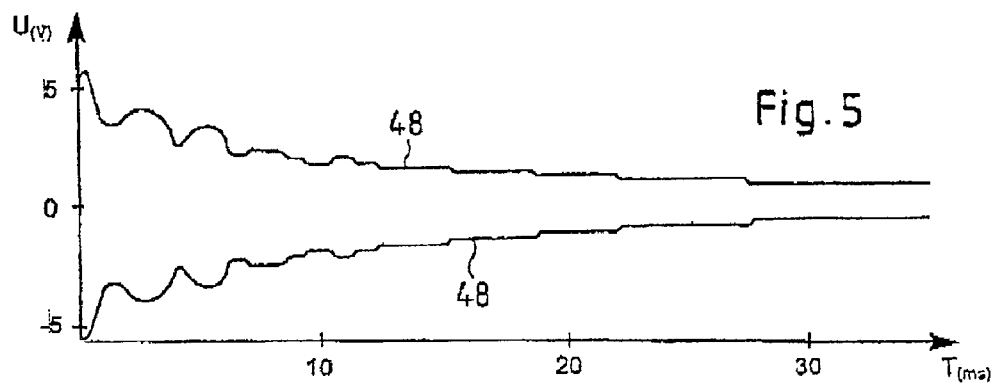
FIG. 5 is a similar graph, obtained by direct oscilloscope measurements, showing the envelope of the curve of variation of the voltage at the terminals of the piezo-electric element of the wireless appliance shown in FIG. 1 from the time at which the piezo-active device of that appliance has been caused to resonate by a punctual mechanical action.

FIG. 5 shows the envelope 48 of the alternating current voltage, as measured on an oscilloscope, that appears in practice between the terminals 22 and 23 of the piezo-electric element 18 after the mechanical interface 19 has been subjected to a punctual mechanical activation consisting of the impact of a percussion weight, the element 19 and the interface 19 forming part of a piezo-active device of the same kind as the device 34 described above (see below).

It can be seen that the amplitude of this alternating current voltage increases virtually instantaneously to its maximum value of approximately 6 V, the amplitude of this voltage then decreasing with a generally exponential profile subject to ripple until approximately time T=13.5 ms. Examination of details of the oscilloscope recording not represented here shows that the ripple is due to the fact that the measured voltage is the superposition of two oscillatory movements each of exponentially damped amplitude, having respective frequencies of 4.6 kHz and 400 Hz.

Note that the main frequency of the overall oscillatory movement is 4.6 kHz, the movement at the frequency of 400 Hz having relatively little influence. In particular, the curve (not shown) of the rectified and smoothed voltage that has appeared simultaneously between the terminals 32 and 33 of the emitter circuit 14 has the same general shape as the curve 45 from FIG. 4, especially in its decreasing part.

Figure 6:
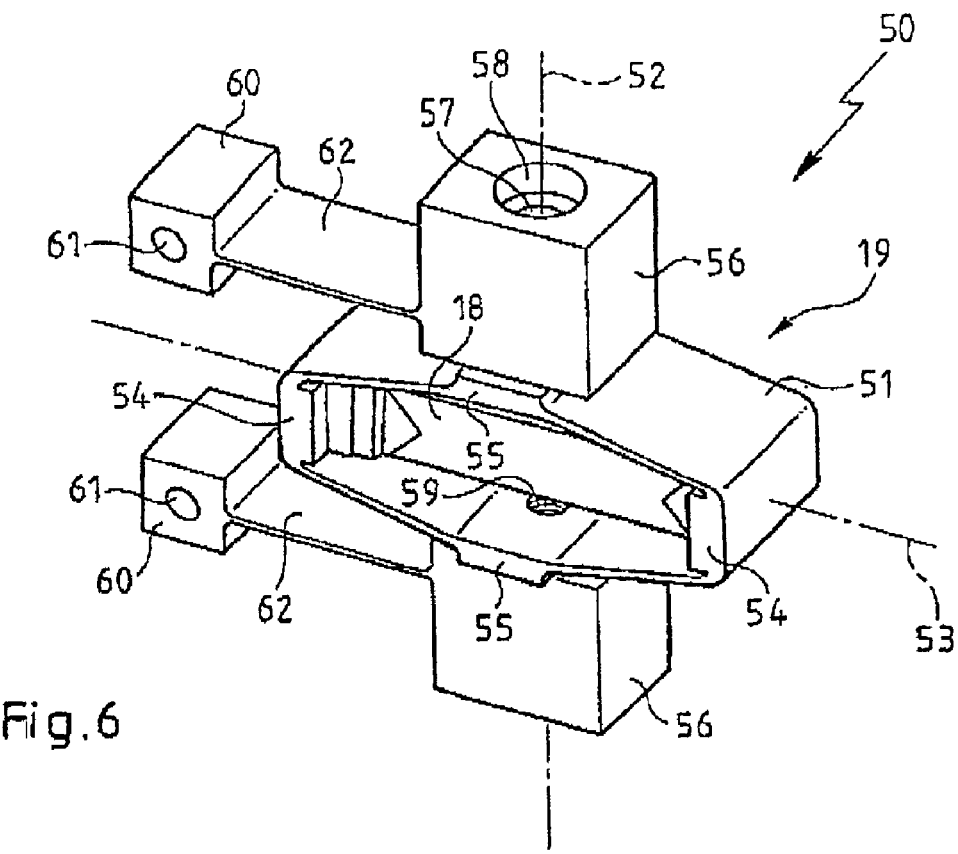
FIG. 6 is a perspective view similar to FIG. 2, showing the piezo-active device with which the wireless appliance shown in FIG. 1 is equipped.

As can be seen in FIG. 6, the piezo-active device 50 of the appliance 2 is similar to the device 34, the piezo-active element 19 being similar to the piezo-active element 35 and being disposed in a metal shell 51 similar to the shell 36 and, like it, extending along a minor axis 52 and along a major axis 53, the element 18 being disposed in the shell 51 between the major axis vertices 54, the shell 51 being attached at each of the minor axis vertices 55 to a weight 56, and the two weights being identical and therefore each having the same mass, which is slightly greater than four times that of the shell 51.

For attaching it to the shell 51, each weight 56 includes a screw (not shown in FIG. 6) whose body and head are respectively accommodated in a bore 57 and in a spot facing 58, the end of the screw cooperating with the threaded hole 59 in the shell 51 similar to the hole 43 in the shell 36, each weight 56 being disposed on the outside and against a flat face provided at a respective vertex 55, and each of the weights 56 being centered on the minor axis 52.

The mechanical interface 19 is therefore formed by the shell 51 and by the two weights 56.

To mount the device 50 on a frame that the appliance 2 includes, two fixing blocks 60 are provided each having a bore 61 to accommodate the body of a screw whose head bears on the block 60 around the bore 61 and the end of whose shank is engaged in a threaded hole in the frame. Each block 60 is connected to a respective weight 56 by a leaf spring 62, respective ends of which are fixed into the block 60 and into the weight 56.

In the example shown, each of the combinations formed by a leaf spring 62 and by the block 60 and the weight 56 between which the leaf spring is located is in one piece and obtained by machining a bar of elastically deformable metal.

When each of the blocks 60 is fixed to the above-mentioned frame, the two leaf springs 62 are disposed parallel to each other. Accordingly, if the piezo-active device 50 is moved relative to the frame along the axis 52, the two leaf springs 62 are deformed in the same fashion and therefore exert on the shell 51 the same force opposing that movement, with the result that the forces exerted by the leaf spring 62 do not tend to deform the shell 51 (all this happens as if the leaf springs 62 were connected to the center of the piezo-electric element 18).

If the above-mentioned movement oriented along the minor axis 52 is effected while the device 50 is resonating, with the minor axis vertices 55 moving in phase opposition, for example, the forces exerted by the two leaf springs 62 are not strictly identical, but as the amplitude of the oscillations of the vertices 55 is very small, the different deformations of the leaf springs 62 have virtually no effect.

As disclosed above with reference to FIG. 5, which reflects in the electrical domain the characteristics of the mechanical excitation 17 that is exerted on the piezo-electric element 18, when it resonates, the device 50 oscillates with a movement which consists of two superposed oscillatory movements each with its amplitude damped exponentially, the main movement having a frequency of 4.6 kHz and the secondary movement a frequency of 400 Hz.

Adding the weights 56 to the prior art piezo-active device 34 has a number of advantages, and in particular:

it minimizes the phenomenon of complex behavior of the oscillator (multiple resonant frequencies);

it procures movement of the minor axis vertices 55 that is in phase opposition, which maximizes the deformation of the piezo-electric element 18 and therefore procures the best possible electro-mechanical coupling characteristics, optimizing the energy recovery possibilities; and it reduces the main resonant frequency compared to a solution in which the two minor axis vertices are mobile relative to the frame on which the shell 51 is to be mounted, without the weights 56, In this latter regard, note that without the weights 56 the shell 51 with its two major axis vertices 55 free to move would have a main resonant frequency of the order of 11 kHz. The mechanical damping due to the piezo-electric element 18 would therefore be greater, which, on the one hand, would represent a penalty in terms of electro-mechanical coupling while, on the other hand, the fact that the piezo-electric element 19 behaves like a generator of electrical charges (the mean current produced is directly proportional to the mechanical excitation frequency), would consequently lead to very fast charging of the capacitor 31 and therefore a high supply voltage to the emitter circuit 14, which would then draw more current (as indicated above, its input resistance R is approximately constant), as a result of which the time for which the voltage is above the threshold would be reduced, and might be less than the time needed to send the complete signal.

Figure 7:
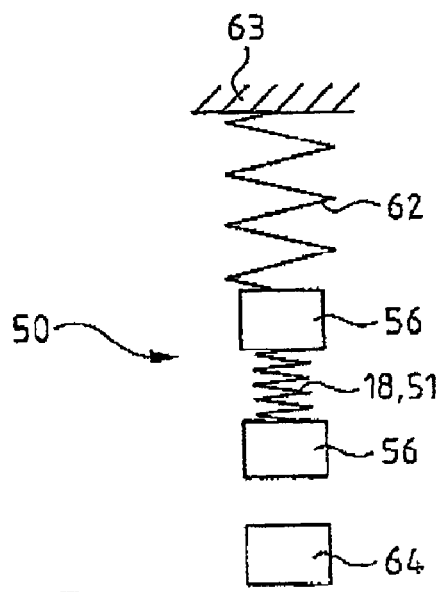
FIG. 7 is a diagrammatic representation of the mechanical system formed by the piezo-active device shown in FIG. 6, the frame to which that device is fixed, and a percussion weight adapted to strike one of the weights of the device when action is exerted on the rocker of the appliance shown in FIG. 1.

FIG. 7 is a diagrammatic representation of the mechanical system formed by the piezo-active device 50, by the frame 63 to which that member is fixed via leaf springs 62, and by a percussion weight 64 adapted to strike one of the weights 56 in order to cause the device 50 to resonate to simplify the drawing, the leaf springs 62 are shown between one of the weights 56 and the frame 63 (as indicated above, it is assumed that the device 50 interacts with the leaf spring 62 as if they were fixed to the center of the element 18 and therefore as if the device 50 were rigid).

The combination of the shell 51 and the element 18 is similar to a simple spring of negligible mass, and the same applies to the leaf spring 62.

The percussion weight 64 has a mass of the order of 6 grams, which is substantially equal to that of the weight 56 that it faces and strikes, as explained below, at a relatively high speed, for example 0.6 m/s, moving substantially along the minor axis 52, the effect of the equal masses of the weights 64 and 56 being that all or almost all of the kinetic energy of the percussion weight 64 is communicated on impact to the weight 56 that it strikes, the effect of the impact being to immobilize the weight 64 quasi-instantaneously at the point of impact and to cause the device 50 to resonate, the two weights 56 of which, each of which is mobile relative to the frame 63, then oscillating in phase opposition.

The alignment or the substantial alignment of the path of the weight 64 and the minor axis 52 favors the transmission of the shock wave and is therefore favorable in terms of efficient transfer of energy between the weight 64 and the device 50.

The fact that the connection between the device 50 and the frame 63 is effected by the leaf springs 62 offers the advantage of preventing the device 50 transferring vibrations to the frame 63.

Another effect of the impact between the weights 64 and 56 is that the device 50, which cooperates with the leaf springs 62 as if it were rigid, is subject to some oscillatory movement relative to the frame 63, the frequency of which movement depends on the stiffness of the leaf springs 62 and on the mass of the device 50, as is well known in the art.

Because of the oscillation of the device 50 relative to the frame 63, and because the percussion weight 64 is immobilized immediately it strikes the facing weight 56, the device 50 strikes the percussion weight 64 at regular intervals. Provided that the stiffness of the leaf springs 62 is carefully chosen, this offers the advantage that the device 50 can be activated again so that the voltage at the terminals of the emitter circuit 14 increases, which increases commensurately the time period for which this voltage remains above the operating threshold of the emitter circuit 14 (see below, in the description relating to FIG. 13).

How movement of the percussion weight 64 is controlled is explained next with reference to FIGS. 8 to 11.

This weight is part of the activation means 20 (FIG. 1), of which it constitutes the inertia means which are adapted, after acceleration, to exert the punctual mechanical action 21 at the interface 19, the activation means 20 including, in addition to the percussion weight 64, launching means, of which the rocker 16 is part, for transforming the action 15 into the acceleration of the percussion striker 64.

FIGS. 8 to 11 show diagrammatically the piezo-active device 50, the frame 63, the leaf springs 62 for mounting the device 50 on the frame, and the percussion weight 64 and its launching means.

Figure 10:
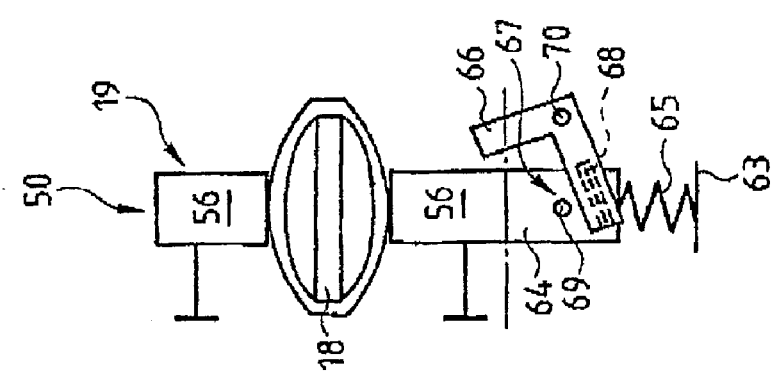
Figure 9:
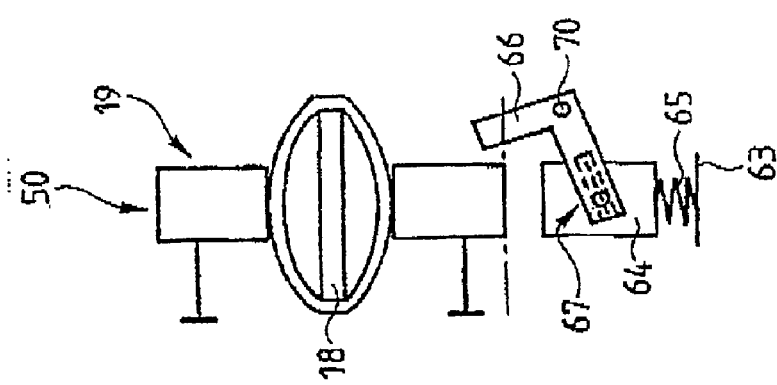
Figure 8:
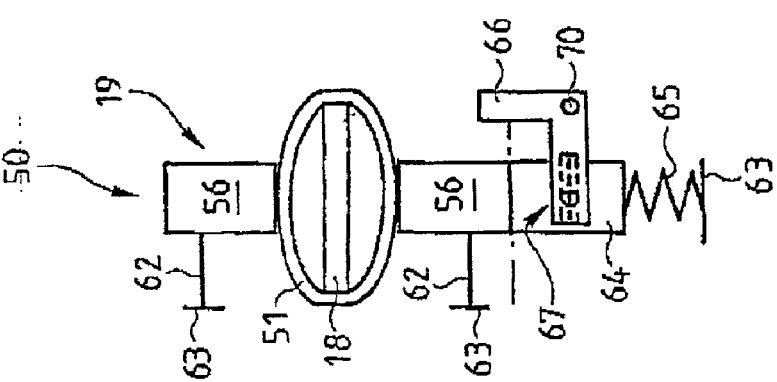

The latter means include, in addition to the rocker 16 (not shown in FIGS. 8 to 11), spring means 65 for spring-loading the weight 64 toward an impact position of the weight 56 facing it, drive means 66 operating against the action of the spring means 65 for moving the weight 64 when the action 15 is exerted on the rocker 16, from the rest position shown in FIG. 8 to the armed position shown in FIG. 9, and, finally, releasable connecting means 67 between the drive means 66 and the weight 64, which are adapted, when the armed position is reached (see FIG. 9), to release the weight 64, which then accelerates, as previously mentioned, by virtue of the spring means 65 driving it to the impact position shown in FIG. 10, the weight 64 here having an impact position coinciding with its rest position (FIG. 8).

As explained above, the device 50, after it is struck by the weight 64, begins to resonate with its two weights 56 oscillating in phase opposition, while the device 50 oscillates through deformation of the leaf springs 62 relative to the frame 63 so that it strikes the weight 64 at regular intervals.

Figure 11:
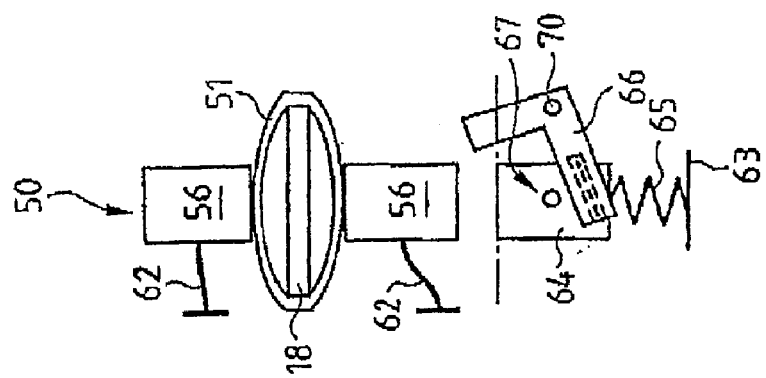
FIGS. 8 to 11 are other diagrammatic representations of this system, showing the movements of the percussion weight and the launching means with which it cooperates and how the device shown in FIG. 6 is deformed after it has been struck by the percussion weight, FIGS. 8 to 11 respectively showing more precisely the rest position, the armed position of the percussion weight, the impact position, and a position in which the piezo-active device is both resonating and oscillating relative to the frame as a result of the impact exerted on it by the percussion weight.

Of course, the deformations of the leaf spring 62 and the shell 51 shown in FIG. 11 are exaggerated to make the drawing clearer. Note that in practice these deformations are very small, the maximum amplitude of the movement of the weights 56 relative to the rest state being a few tens of $\mu$n, for example.

In the example shown, the releasable connecting means release the percussion weight when the spring means 65 exert a predetermined force on the latter.

The releasable connecting means include an imprint 68 here formed in the drive means 66, and a spring-loaded ball 69, here mounted on the weight 64, through the intermediary of a piston that guides it, the ball 69 locating in the imprint 68 and remaining therein as long as the force exerted by the spring means 65 remains less than the above-mentioned predetermined force.

Of course, the imprint can instead be formed on the weight and the ball mounted on the drive means.

In FIGS. 8 to 11, the drive means 66 are symbolized by a lever with two branches articulated about an axis 70 located at the junction between the two branches. To simplify the diagrammatic representation of FIGS. 8 to 11, the axis 70 is shown with a transverse orientation relative to that of the shell 51, but in practice, in the example described, as explained later, the axis 70 is parallel to the shell 51.

Rearming means, not shown in FIGS. 8 to 11, are provided for returning the lever 66 to its initial position, and thereby the rocker 16 that cooperates with this lever, this returning of the lever 66 to its initial position having the effect of engaging the releasable connecting means 67.

There is therefore an automatic return to the rest position shown in FIG. 8.

Figure 12:
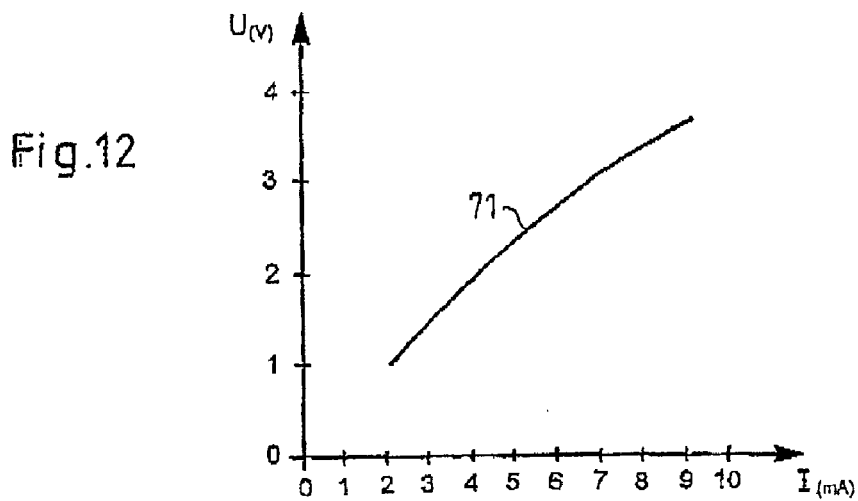
FIG. 12 is a graph showing the current-voltage characteristic of the emitter circuit of the wireless appliance shown in FIG. 1.

The curve 71 in FIG. 12 shows the current-voltage characteristic of the emitter circuit 14.

It can be seen that, as indicated above, the supply voltage threshold from which the circuit 14 begins to operate is 1 V and that the circuit 14 then absorbs a current of 2 mA, which corresponds to an input resistance R of 500 $\Omega$.

If the input voltage is of the order of 3.3 V, the current absorbed by the circuit 14 is substantially equal to 8 mA, so that at this operating point the input resistance is substantially equal to 400 $\Omega$.

Thus it can be seen that the input resistance of the emitter circuit 14 remains substantially constant and that the power absorbed by the circuit is therefore proportional to the voltage between the terminals 32 and 33.

Figure 13:
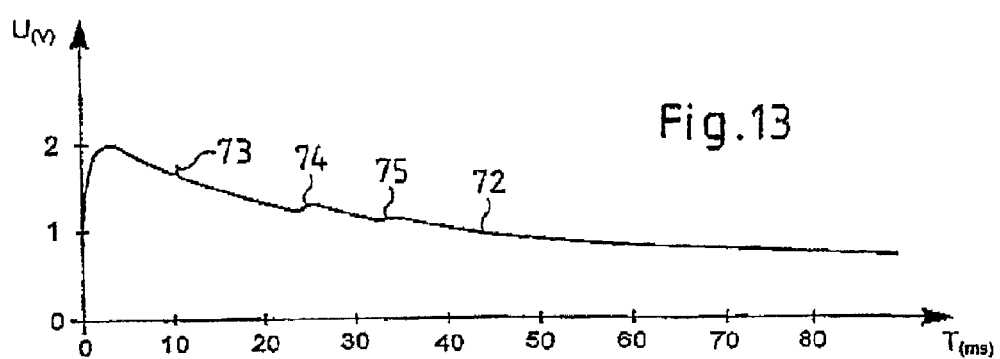
FIG. 13 is a graph similar to that of FIG. 4, obtained by direct oscilloscope measurement at the power supply terminals of the emitter circuit of the wireless appliance shown in FIG. 1.

As indicated above, the curve 72 shown in FIG. 13 is similar to the curve 45 shown in FIG. 4, but shows, rather than the voltage variation at the input terminals of the emitter circuit 14 obtained by modeling, the voltage variation measured by means of an oscilloscope.

The curve 72 has the same general shape as the curve 45, but the maximum value reached is only 2 V, essentially because the punctual mechanical action 21 is in practice weaker than was assumed for the model on which FIGS. 3 and 4 are based.

At this maximum voltage of 2 V, the emitter circuit 14 absorbs a current which is of the order of 4 mA, as shown by the curve 71.

Accordingly, if the input terminals of the circuit 14 are subjected to the voltage variation that the curve 73 represents, the input resistance R of the circuit remains substantially equal to 500 Ω.

Because, for this experimental measurement, the capacitor 31 in fact had a capacitance C of 30 $\mu$F, the time constant RC is 15 ms.

As indicated with reference to FIG. 5, the main frequency of the corresponding voltage that was present simultaneously at the terminals 22 and 23 of the piezo-electric element 18 was 4.6 kHz.

The term RCf was therefore equal to 69.

Good smoothing is therefore effected by the capacitor 31 with the capacitance just indicated.

As indicated above, because it is mounted on the frame 63 by means of the spring means that the leaf springs 62 constitute, the device 50 oscillates relative to the frame and strikes the percussion weight 64 at regular intervals, which activates the oscillator 19 again.

Note, on the one hand, that the experiment during which the alternating current voltage whose envelope is shown in FIG. 5 was recorded was carried out under conditions such that the punctual mechanical action 21 was stronger than during the experiment that produced the curve shown in FIG. 13, which is why the maximum value of the curve 72 is only 2 V, and, on the other hand, that the experiment corresponding to FIG. 5 was carried out with a stiffness of the leaf springs 62 such that, allowing for the mass of the device 50, the rebound on the weight 69 had virtually no effect on the curve recorded.

On the other hand, the experiment that produced the is curve 72 was carried out under conditions in which the stiffness of the leaf springs 72 and the mass of the device 50 caused the device 50 to rebound from the percussion weight 64 with a period of approximately 7.14 ms.

The first bounce that occurred had relatively little effect on the voltage at the terminals of the circuit 14, in which only a localized peak 73 appeared.

A second bounce occurred under conditions such that it had no effect on the curve 72.

However, the third and fourth bounces occurred when the voltage at the terminals of the emitter circuit 14 had already fallen sufficiently for a voltage increase to be possible, as shown by the increasing portions 74 and 75 of the curve 72.

The fifth and subsequent bounces, although they caused the voltage at the terminals 22 and 23 of the piezo-electric element 18 to rise, did not have sufficient intensity to bring about an increase in the curve 72.

The practical implementation of the wireless electrical appliance 2 is described next.

Figure 14:
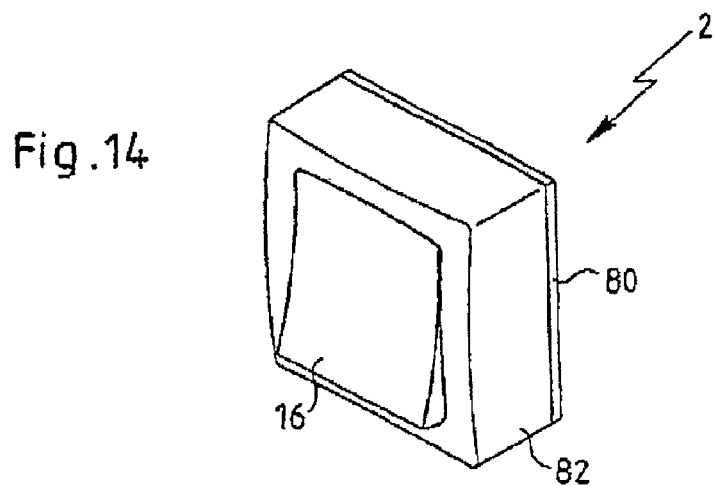
FIG. 14 is a perspective view of the wireless appliance shown diagrammatically in FIG. 1.
Figure 15:
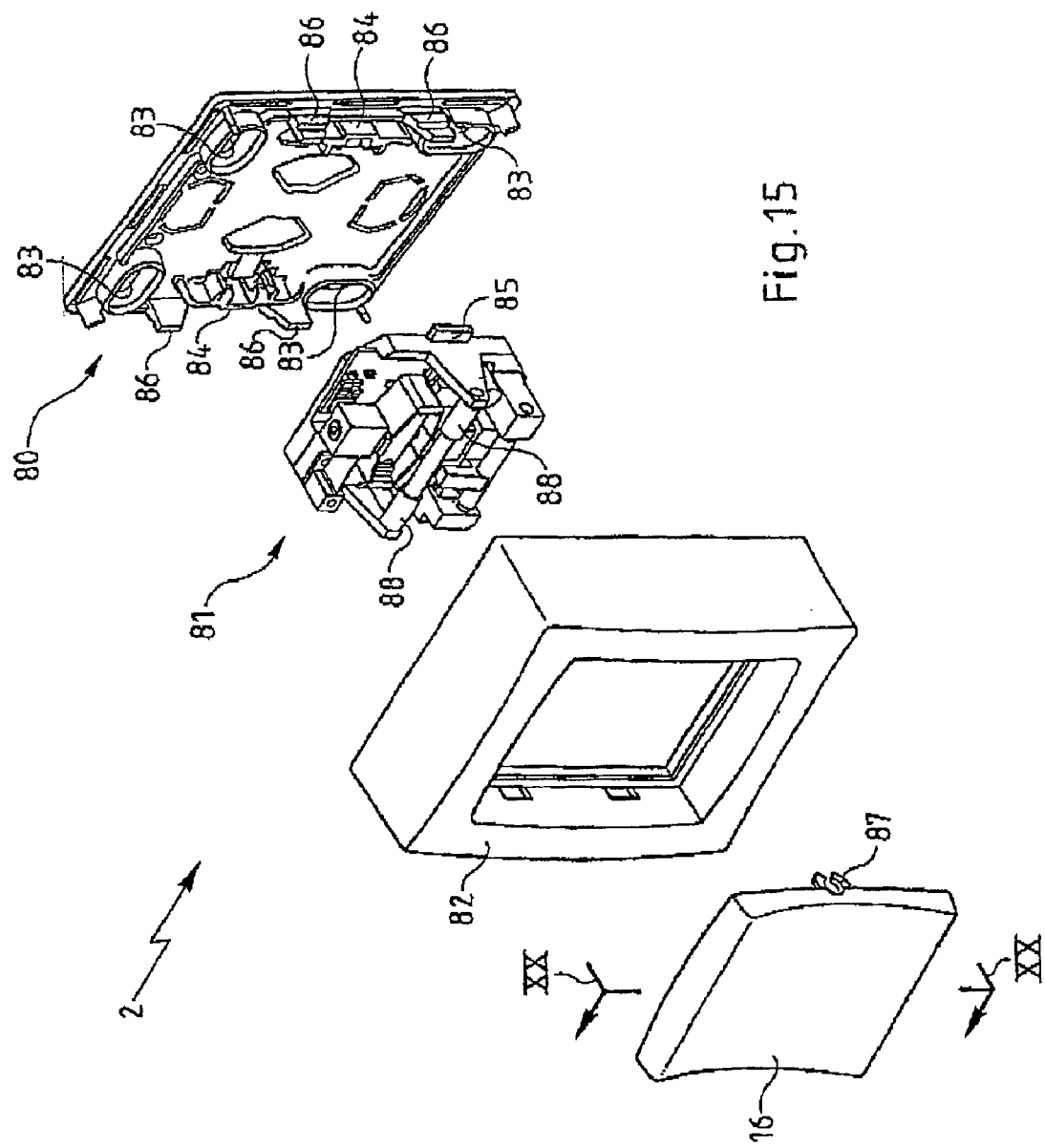
FIG. 15 is an exploded view of it.

As can be seen in FIGS. 14 and 15, the appliance 2 takes the conventional form of a surface-mounted electrical installation switch including a base 80 adapted to be fixed to a wall, a mechanism 81 adapted to be clipped to the base 80, a frame 82 clipped to the base 80 and surrounding the mechanism 81, and the rocker 16, which is accessible on the front face of the frame 92 and cooperates with the mechanism 81.

In the conventional way, applying a force of at most 3 Newtons (N) over a travel of at most 3 millimeters (mm), i.e. an energy of at most 9 millijoules (mJ), is sufficient to maneuver the rocker 16. The action 15 therefore corresponds to the application of this kind of force.

The base 80 has an oblong fixing hole 83 in each corner for fixing it to a wall.

The mechanism 81 is clipped to the base 80 by two elastically deformable clips 84 on two opposite sides of the base 80 and two conjugate lugs 85 on the mechanism 81.

The frame 82 is clipped to the base 80 by four flexible lugs 06 on the base 80 each adapted to cooperate with a detent (not shown) on the frame 82.

For mounting it on the mechanism 81 so that it can tilt, the rocker 16 includes two opposite hooks 87 each disposed approximately in the middle of one of its sides, each hook 87 being adapted to clip onto a respective cylindrical bearing surface 88 on the mechanism 81.

Thus the appliance 2 it conventionally arranged, using a base 80 and a frame 82 that is standard for a whole range of appliances, the elements specific to the appliance 2 being the mechanism 81 and the rocker 16, which together form what is generally called a composite mechanism.

Figure 16:
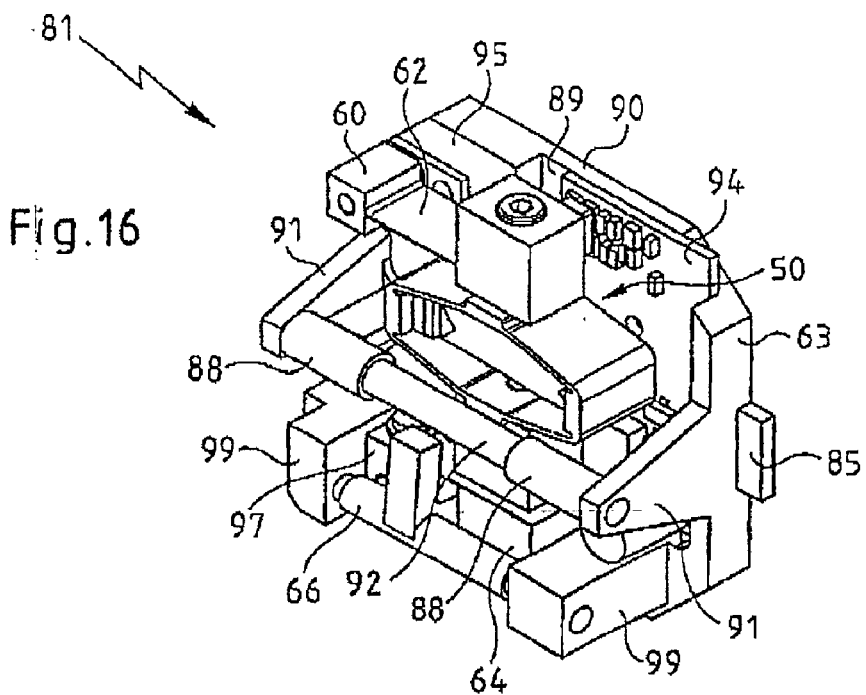
FIG. 16 shows only the mechanism of the appliance, in the same way, but to a larger scale.
Figure 17:
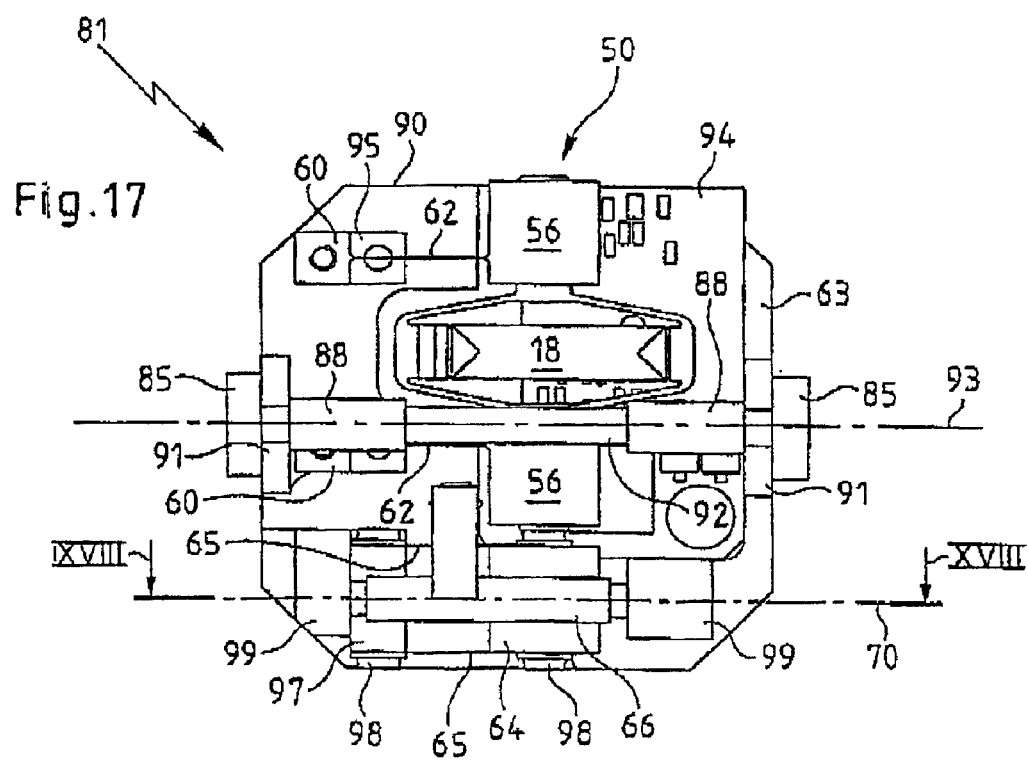
FIG. 17 is a view in elevation of the latter.

As can be seen in FIGS. 16 and 17 in particular, it is the mechanism 81 that includes, the frame 63 shown diagrammatically in FIGS. 7 to 11, this frame being generally rectangular in shape and having a back 90 on which are two upstanding columns 91, each situated in the middle of a respective one of two opposite sides, the columns 91 carrying at the top a rod 92 oriented along an axis 93 (FIG. 17) and provided with bearing surfaces 88 onto which the hooks 87 of the rocker 16 clip, so that after clipping it on, the rocker is able to tilt about the axis 93.

A recess 89 is formed in the back 90, in which is installed an electrical circuit 94 including the rectifier system 26, the capacitor 31 and the emitter circuit 14.

The combination formed by the device 50, the leaf springs 62 and the blocks 60 is fixed to the back 90 of the frame 63 by spacers 95 which hold the device 50 sufficiently far away from the back 90 for it to execute the movements that are necessary to its operation.

Likewise, the member 50 is mounted elastically opposite the frame 63 by means of two leaf springs 62, and the percussion weight 64 is mounted on the frame 63 by means of two leaf springs 65 (see FIG. 17) each rigidly fixed at its respective ends to the percussion weight 64 and a fixing block 97 by means of a screw 98.

The drive lever 66 is mounted at the top of columns 99 so that it can rotate about the axis 70 which, as indicated above, is not disposed transversely to the device 50 (this representation was adopted for simplicity in FIG. 8 to 11), but is in fact parallel to the device 50, i.e. to the plane containing the minor axis 52 and the major axis 53, which is itself parallel to the general orientation of the back 90 of the frame 63.

Figure 18:
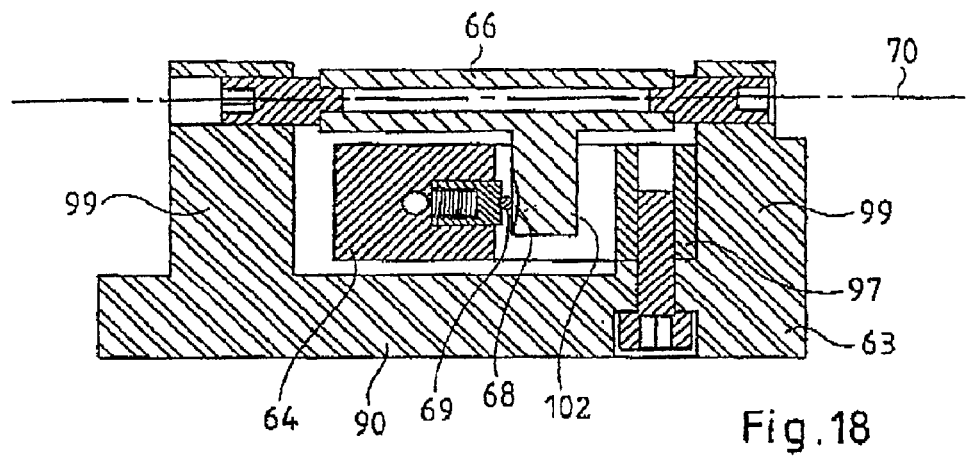
FIG. 18 is the view in section taken along the line XvIII—XvIII in FIG. 17.
Figure 19:
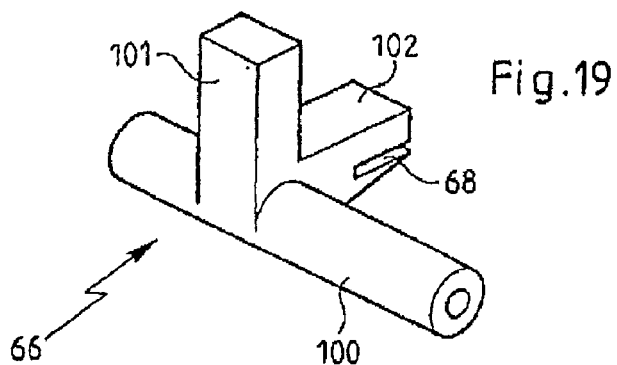
FIG. 19 is a perspective view of the lever, belonging to the launching means, that the mechanism includes between the rocker and the percussion weight.

As can be seen in FIGS. 18 and 19 in particular, the lever 66 includes, in addition to a generally tubular portion 100 whose ends are rotatably mounted on the columns 99, an angle-bracket oriented transversely to the tubular part 100, which is connected to it at the junction between the two branches 101 and 102.

Figure 20:
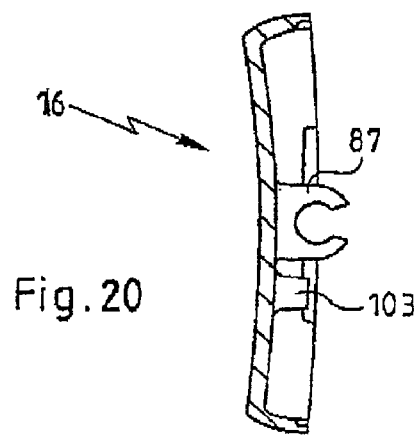
FIG. 20 is the elevation view of the rocker in section taken along the line XX—XX in FIG. 15.

In the rest state, shown in FIGS. 15 to 18, the branch 102 is oriented in a transverse direction to the back 90 of the frame 63 and is disposed between the leaf springs 65 facing the percussion weight 64, the spring-loaded ball 69 mounted on the percussion weight 64 being engaged in the imprint 68. In this rest position, the branch 101 is oriented in a direction substantially parallel to the back 90 of the frame 63, with the bearing finger 103 projecting from the inside of the rocker 16 (see FIG. 20) and against the branch 101.

Figure 21:
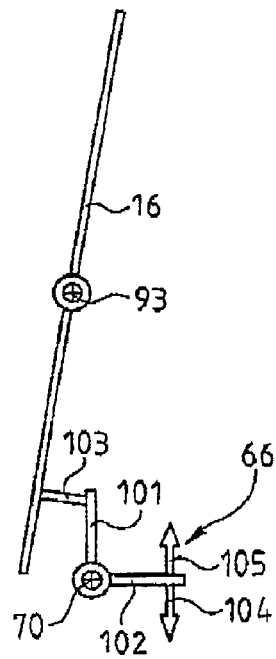
FIG. 21 is a diagrammatic representation of the mechanical system formed by the rocker and by the lever.

As shown better in the FIG. 21 schematic, when the projecting side of the rocker 16 is depressed, i.e. the side, with respect to the axis 93, on which the finger 103 is located, this causes the lever 66 to pivot about the axis 70 in the direction indicated by the arrow 104, i.e. in the direction that moves the percussion weight 64 away from the facing weight 56, against the action of the leaf springs 65.

As previously explained, when the force exerted by the leaf springs 65 on the weight 64 reaches a threshold predetermined by the spring-loading force exerted on the ball 69 and by the slope of a ramp in the imprint 68, the ball 69 is moved elastically towards the interior of the weight 64, compressing the spring-loading spring, so that the weight 64 is released and strikes the device 50.

The means for mounting the ends of the tubular portion 100 on the columns 99 include a torsion spring (not shown) which spring-loads the lever 66 in the direction shown by the arrow 105 in FIG. 21, i.e. in the direction opposite to that represented by the arrow 104, these spring return means returning the lever 66 to its initial position in which the branch 101 bears against the finger 103 with the rocker 16 which is abutted against the frame 31 on the opposite side, with respect to the axis 93, to the finger 103, the lever 66 returning to the initial position also engaging the releasable connecting means 67, i.e. causing the ball 69 to enter the imprint 68 again.

Note that, generally speaking, in the appliance 2, the percussion weight 64, the leaf springs 65 and the drive lever 66 are disposed between the rocker 16 and the back 90, which is separated from the rocker by the thickness of the mechanism 81, more generally by the thickness of the appliance 2.

The path that the percussion weight 64 follows, guided by the leaf springs 65, is substantially rectilinear and, like the minor axis 52, parallel to the back 90 of the frame 63.

Figure 22:
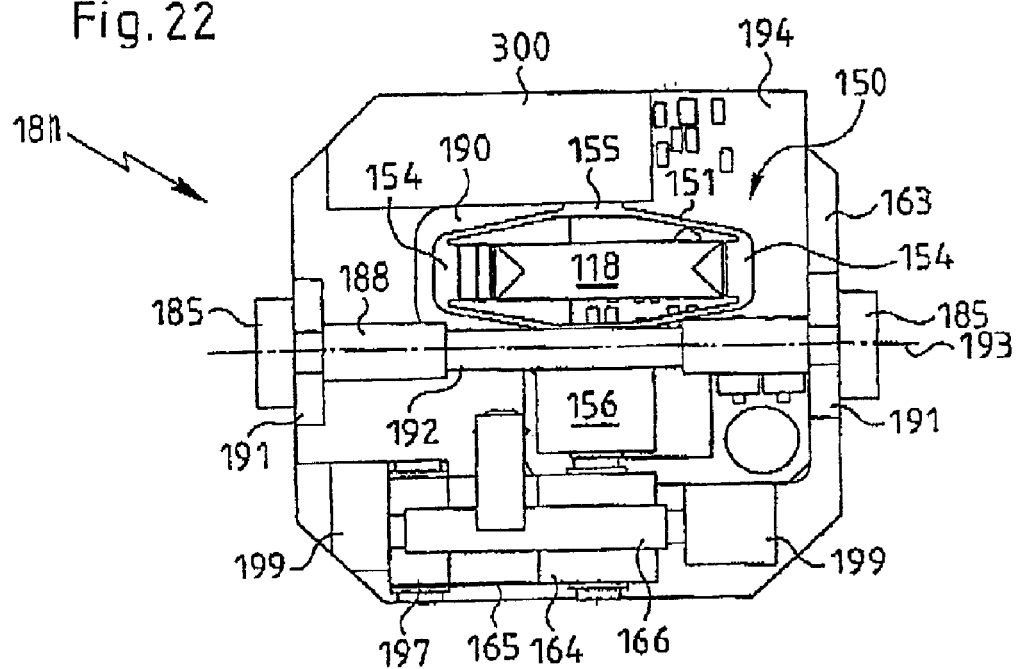
FIG. 22 is a view similar to FIG. 17 of a variant of the mechanism of the wireless appliance.
Figure 23:
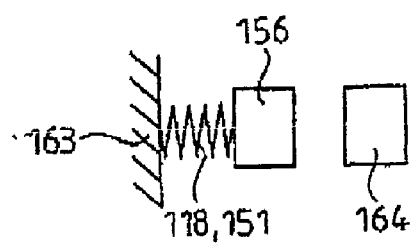
FIG. 23 is a diagrammatic representation similar to FIG. 7 of the mechanism from FIG. 22.

The variant 181 of the mechanism 81 shown in FIG. 22 is described next.

The same reference numbers increased by 100 are used for similar items.

Generally speaking, the piezo-active device 150 is similar to the device 34 but includes a localized weight 156 similar to the weight 56 that is fastened to one of the minor axis vertices 155 of the shell 151, in this instance the vertex that is at the bottom in FIG. 22.

The frame 163 of the mechanism 181 is similar to the frame 63 but includes a rigid beam 300 which is connected to the remainder of the frame 163 at the location of the spacers 95 in the frame 63, the beam 300 extending cantilever-fashion above the electrical circuit 194 beyond this connecting area.

The device 150 is mounted on the frame 163 by screwing the minor axis vertex 155 which is at the top in FIG. 22 to the rigid beam 300.

Accordingly, although the device 50 is mounted on the frame 63 so that each minor axis vertex is mobile relative to it, the device 150 has one of the minor axis vertices 155 fastened to the frame while the other minor axis vertex, at which the shell 151 is fastened to the weight 156, can move relative to the frame 163.

The percussion weight 164 is controlled in exactly the same fashion as the weight 64 so that it strikes the weight 156.

The mechanical interface of the device 150, formed by the shell 151 and by the weight 156, is such that after the impact the piezo-electric element 118 produces an alternating current voltage, reflecting the resonant movement of the device 150, which, as mentioned above, has a frequency lower than that of the device 50, the electrical circuit 194 being adapted to the characteristics of this alternating current voltage.

Note that although the signal 13 emitted by the circuit 14 is a radio signal in this example, it can be replaced by any other type of signal transmitted by means of electromagnetic waves.

In a variant that is not shown, the shell 51 and the weight 56, and even the leaf springs 62 and the fixing blocks 60, are assembled by means other than screws, in particular by gluing or by welding, or are made in one piece, and likewise the shell 151 and the weight 156.

In another variant that is not shown, the electrical circuit is different, and in particular the rectifier system 26 is replaced by another type of rectifier circuit, for example a half-wave rectifier or a voltage doubler.

In further variants that are not shown, the wireless appliance 2 is replaced by a different wireless appliance also used for remote control, for example to open the door of, a vehicle, a gate or a garage door, or even constitutes an appliance other than a remote controller, for example a sensor or a device for emitting brief signals at the rhythm of successive actions like the action 15 exerted on the rocker 16 or on another mobile triggering member, for example a pull-rod.

In still further variants that are not shown, the circuit 14 is replaced by another type of direct current consuming element that does not emit any signal transmitted by electromagnetic waves, for example a watch motor, with the action 15 exerted at regular intervals by a pendulum type mechanism, or a circuit including a non-volatile memory serving as a counter, in which case the action 15 is replaced by an action representative of an event to be counted, for example a vehicle passing on a road, means for interrogating the non-volatile member being further provided for reading the content thereof.

Many other variants are feasible, depending on circumstances, and it is to be remembered in this regard that the invention is not limited to the examples described and shown.

What is claimed is:

1. A method of operating a piezo-active device including a piezo-electric element and an elastically deformable shell with a substantially closed profile to produce AC output, said piezo-electric element being disposed in said shell, the method comprising the steps of:

connecting output terminals of said piezo-electric element to input terminals of an electrical circuit adapted to receive an alternating current power-supply; and supplying power from the piezo-electric element to said electrical circuit by exerting a punctual mechanical action on said device and then allowing it to resonate freely so that, subsequently to said punctual mechanical action, said piezo-electric element produces an alternating current voltage between its output terminals and therefore between the input terminals of said circuit;

wherein the piezo-electric element is structured to resonate as a mechanical oscillator following the punctual mechanical action.

2. The method claimed in claim 1, wherein said elastically deformable shell has an elliptical profile with four vertices opposed in pairs, namely two minor axis vertices and two major axis vertices, with the distance between the two major axis vertices greater than the distance between the two minor axis vertices, said piezo-electric element is disposed in said shell between the two major axis vertices, and said piezo-active device further includes a localized weight fastened to said shell at a minor axis vertex and whose mass is greater than that of the shell.

3. The method claimed in claim 2, wherein said weight has a mass more than four times that of the shell.

4. The method claimed in claim 2, wherein said device includes a weight fastened to said shell at each of the minor axis vertices.

5. The method claimed in claim 4, wherein each weight has substantially the same mass.

6. The method claimed in claim 1, wherein said punctual mechanical action is exerted on said device at a location other than on said piezo-electric element.

7. The method claimed in claim 2, wherein said punctual mechanical action is exerted on said device at a weight.

8. An electrical appliance comprising:
a piezo-active device including a piezo-electric element and an elastically deformable shell with a closed profile, said piezo-electric element being disposed in said shell;
an electrical circuit adapted to be supplied with power by an alternating current and having input terminals connected to output terminals of said piezo-electric element; and
for supplying power from the piezo-electric element to said electrical circuit, means for applying a punctual mechanical action to said device;
wherein the piezo-electric element is structured to resonate as a mechanical oscillator following the punctual mechanical action.

9. The appliance claimed in claim 8, wherein:
the elastically deformable shell of said device has an elliptical profile with four vertices opposed in pairs, namely two minor axis vertices and two major axis vertices, with the distance between the two major axis vertices greater than the distance between the two minor axis vertices;
said piezo-electric element of said device is disposed in said shell between the two major axis vertices; and
said device further includes a localized weight fastened to said shell at a minor axis vertex and whose mass is greater than that of the shell.

10. The appliance claimed in claim 9, wherein said weight has a mass more than four times that of the shell.

11. The appliance claimed in claim 9, including a frame to which is attached one of said minor axis vertices of the shell, the other minor axis vertex, at which said shell is fastened to a weight, being mobile relative to the frame.

12. The appliance claimed in claim 11, wherein the combination formed by said shell and by said weight is made in one piece.

13. The appliance claimed in claim 9, including a weight fastened to said shell at each of the two minor axis vertices.

14. The appliance claimed in claim 13, wherein all said weights have substantially the same mass.

15. An electrical appliance claimed in claim 13, including a frame on which said device is mounted so that each minor axis vertex of said shell is mobile relative to said frame.

16. The appliance claimed in claim 15, wherein, for mounting said device on said frame, at least one weight is connected to said frame by spring means.

17. The appliance claimed in claim 16, wherein each weight is connected to said frame by an identical leaf spring disposed parallel to the leaf spring of the other weight.

18. The appliance claimed in claim 16, wherein the combination formed by said shell, by the two weights, and by each leaf spring is made in one piece.

19. The appliance claimed in claim 11, including a percussion weight guided relative to said frame to strike said weight or one of said weights fastened to said shell.

20. The appliance claimed in claim 19, wherein said percussion weight is part of activation means further including, for launching said weight:
spring means for spring-loading said percussion weight toward a position of impact on the shell weight that it must strike;
drive means, acting against said spring means of said percussion weight, for moving it from a rest position to an armed position; and
releasable connecting means between said drive means and said percussion weight adapted, when said armed position is reached, to release said percussion weight, which is then accelerated by said spring means which drive it to said impact position.

21. The appliance claimed in claim 20, wherein the rest position and the impact position coincide.

22. The appliance claimed in claim 19, wherein said percussion weight has a mass substantially equal to that of the shell weight that it strikes.

23. The appliance claimed in claim 8, wherein said electrical circuit includes:
a rectifier system formed by four diodes in a Grätz bridge to perform full-wave rectification, the input terminals of said rectifier system forming the input terminals of said electrical circuit and therefore being connected to the terminals of said piezo-electric element;
a capacitor connected to the output terminals of said rectifier system; and
a circuit adapted to be supplied with power by an alternating current whose power supply terminals are connected to the output terminals of said rectifier system so that said circuit is in parallel with said capacitor.

24. The appliance claimed in claim 23, wherein, said circuit adapted to be supplied with power by a direct current having a substantially constant input resistance R, said capacitor having a capacitance C, the term RC, R being expressed in Ω and C in F, is substantially equal to a predetermined duration allowing operation of said circuit adapted to be supplied with power by a direct current.

25. The appliance claimed in claim 8, wherein said electrical circuit includes a circuit adapted to emit electromagnetic waves supplied with electrical power by said piezo-electric element.

26. The appliance claimed in claim 25, wherein said circuit for emitting electromagnetic waves is a circuit for emitting radio waves.

27. A system including a first appliance as claimed in claim 25 and a second appliance including a receiver circuit adapted to receive waves emitted by the emitter circuit included in said first appliance.

28. The system claimed in claim 27, wherein said second appliance includes electrical control means adapted to be actuated in response to the reception of said electromagnetic waves.

29. The system claimed in claim 28, wherein said electrical control means include switching means.

* * * * *